United States Patent

Haruna et al.

[15] 3,654,412
[45] Apr. 4, 1972

[54] MOTOR VEHICLE PRESSURE ACTUATED DEFORMATION RESPONSIVE SWITCH WITH PISTON ACTUATOR AND VENT OPENING

[72] Inventors: Takashi Haruna, Yokosuka; Hitoshi Sato, Yokohama, both of Japan

[73] Assignee: Nissan Motor Company Limited, Yokohama, Japan

[22] Filed: Feb. 10, 1971

[21] Appl. No.: 122,881

[52] U.S. Cl. ..................200/832, 180/91, 200/DIG. 10, 200/82 D, 340/61
[51] Int. Cl. ..............H01h 35/34, H01h 35/14, B60r 27/00
[58] Field of Search...........180/91, 94, 96; 200/832, 81 H, 200/61.08, 61.53, 82 D, DIG. 10; 340/61; 116/32

[56] References Cited

UNITED STATES PATENTS

| | | | |
|---|---|---|---|
| 1,721,605 | 7/1929 | Schanman et al. | 180/96 X |
| 3,459,954 | 8/1969 | Sgorbani | 200/82 D X |

FOREIGN PATENTS OR APPLICATIONS

| | | | |
|---|---|---|---|
| 836,126 | 6/1960 | Great Britain | 340/61 |
| 840,236 | 7/1960 | Great Britain | 200/83 R |
| 285,782 | 5/1931 | Italy | 180/91 |

Primary Examiner—Robert K. Schaefer
Assistant Examiner—Robert A. Vanderhye
Attorney—John Lezdey

[57] ABSTRACT

A trigger switch mechanism adapted to actuate motor vehicle safety devices in response to deformation of a particular portion of the vehicle body resulting from a collision of the motor vehicle with an obstruction. The mechanism comprises a cylinder mounted inside the particular portion of the vehicle body. A slidable piston is mounted within the cylinder and has a rod integrally formed therein. The rod extends axially from the piston and terminates at a suitable distance from the particular portion of the vehicle body. Deformation of the particular portion of the vehicle body exerts a force on the piston tending to move it in one direction. A shear pin is provided in the cylinder to prevent such piston movement until the force exceeds a predetermined magnitude. A pressure-sensitive switch is provided to close a circuit leading to the safety devices when the pressure within the cylinder chamber exceeds a predetermined level caused by the movement of the piston. A vent opening is provided in the cylinder so that the pressure within the same cannot exceed the predetermined level in the event of only a slight collision. The piston has another rod extending axially from the piston in the other direction. When the displacement of the piston exceeds a predetermined magnitude, the rod acts directly on the pressure-sensitive switch to close it.

6 Claims, 1 Drawing Figure

PATENTED APR 4 1972
3,654,412
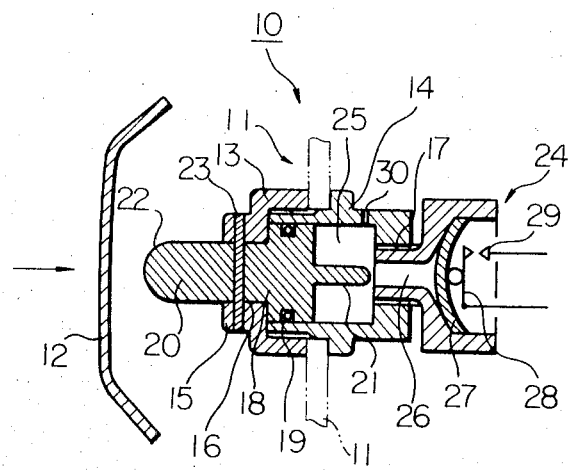
INVENTORS
TAKASHI HARUNA & HITOSHI SATO
BY John Lezelly
ATTORNEY

MOTOR VEHICLE PRESSURE ACTUATED DEFORMATION RESPONSIVE SWITCH WITH PISTON ACTUATOR AND VENT OPENING This invention relates to motor vehicle safety devices and more particularly to a trigger switch mechanism which is adapted to actuate such devices in response to deformation of a bumper or a particular portion of the vehicle body resulting from a collision of the motor vehicle with an obstruction.

Various motor vehicle safety devices have heretofore been proposed and demonstrated, including one having a netting or an air bag which is automatically positioned in a protective position in the event of a collision, thereby preventing injuries including whip-lash injuries of the vehicle occupants. Since, however, these devices when actuated make the driver incapable of controlling the vehicle, tending to expose the vehicle occupants to much danger, care must be taken to have them actuated only upon the occurrence of such a collision as may possibly cause critical physical damage to the occupants.

It is therefore an object of this invention to provide a new and improved trigger switch mechanism that is capable of actuating motor vehicle safety devices with increased reliability by sensing deformation of a bumper or a particular portion of the vehicle body resulting from a collision.

It is another object of this invention to provide a trigger switch mechanism that is insensitive to slight deformations of a bumper or a portion of the vehicle body, for example, resulting from a slight collision with a garage gate or wall.

It is a further object of this invention to provide a quickly responding trigger switch mechanism for a motor vehicle safety device.

It is yet a further object of this invention to provide a trigger switch mechanism which is simple in construction and is increased in reliability.

In the drawing:

The FIGURE is a longitudinal sectional view of a trigger switch mechanism embodying this invention.

Referring to the Figure, there is shown an example of the present trigger switch mechanism 10 to be incorporated into a motor vehicle safety device having a stored netting or air bag (not shown).

The trigger switch mechanism 10 comprises a cylinder 11 mounted on the vehicle body inside a bumper 12. The cylinder 11 is made up of a first cylindrical member 13 having telescoped thereinto a second cylindrical member 14 for the sake of ease of assembly and installation. The first cylindrical member 13 has a circular projection 15 extending concentrically and outwardly from the end thereof. An opening 16 if formed in the first cylindrical member 13 so as to axially extend through the bottom thereof and also the circular projection 15. The second cylindrical member 14 has an opening 17 extending through the bottom thereof in alignment with the opening 16 of the first cylindrical member 13.

A piston 18 is mounted slidably within the cylinder chamber, aided by bearings 19, and comprises a piston 18 having two plungers 20 and 21 integrally formed on the piston 18 extending therefrom in axially opposite directions. The plunger 20 extends through the opening 16 and terminates at a suitable distance from the bumper 12, as is shown in the drawing. The termination or tip 22 of the plunger 20 serves as an impact-sensing head capable of sensing impact pressure exerted thereon by the bumper 12, for example, in the event of a collision. A shear pin 23 is provided in the projection 15 on the first cylindrical member 13 so as to prevent relative movement of the rod or plunger 20 and the first cylindrical member 13. However, it is to be understood that the mechanical strength of the shear pin 23 is such that if impact force exerted on the plunger 20 in a rightward direction as viewed in the drawing exceeds a predetermined value the shear pin 23 is cut permitting the piston 18 to move in the same direction.

A pressure-sensitive switch 24 is mounted on the second cylindrical member 14 and is responsive to the pressure inside of the cylinder chamber 25 to close an electrical circuit when the pressure exceeds a predetermined value. The pressure-sensitive switch 24 includes an inlet port 26 leading to the cylinder chamber 25. A sensor such as a plate-like diaphragm 27 is biased toward the inlet port 26 in such a manner as to tightly seal it off. The diaphragm 27 is operatively connected to a switch arm 28 by a suitable member. The arm 28 is engageable with a fixed contact 29 when the diaphragm 27 is caused to bend away from the inlet port 26 because of a pressure of over a predetermined level exerted on the diaphragm 27.

The second cylindrical member 14 has a vent port or opening 30 provided therein. This vent opening 30 is of such a size that when the velocity of displacement of the piston 18 resulting from deformation of the bumper 12 at the time of a collision exceeds a predetermined magnitude the pressure inside of the cylinder 11 will rise to the predetermined level at which the pressure-sensing switch 24 is actuated because of resistance given to escaping air by the vent opening 30. Thus, with a relatively small displacement, if the velocity of displacement is larger than the predetermined one, the pressure inside the cylinder 11 rises to the predetermined level since the air within the cylinder chamber 25 cannot escape to the outside in a short time, thus causing the actuation of the switch 24.

Furthermore, it is to be noted that the pressure switch 24 is actuated if the displacement of the piston 18 occurring in the event of a collision is large enough that the end of the rod or plunger 21 acts directly on the diaphragm 27 to engage the arm 28 with the fixed contact 29. In this case, the pressure switch 24 is actuated with increased reliability.

As has been described above, this invention provides a new and improved trigger switch mechanism for motor vehicle safety devices which is responsive to deformation of a particular portion of the vehicle body to actuate such devices when the velocity of deformation exceeds a predetermined value or when the deformation exceeds a predetermined magnitude.

What is claimed is:

1. A trigger switch mechanism adapted to actuate motor vehicle safety devices in response to deformation of a particular portion of the vehicle body, said mechanism comprising a cylinder having a cylinder chamber therein, a slidable piston mounted within said cylinder chamber and having a rod integrally formed therein, said rod being positioned relative to said particular portion of the vehicle body such that deformation of said particular portion of the vehicle body exerts a force on said piston and causes it to move axially in one direction, means for holding said piston in a position within said cylinder chamber until said force exceeds a predetermined value, a pressure-sensitive switch provided to close a circuit leading to said safety devices when the pressure within said cylinder chamber exceeds a predetermined level because of the movement of said piston in said one direction, and a vent opening provided in said cylinder, said vent opening being of such a size that only when the velocity of displacement of said piston exceeds a predetermined value the pressure within said cylinder chamber will rise to said predetermined level due to resistance given by escaping air by said sized vent opening.

2. A trigger switch mechanism according to claim 1, in which said piston has another rod integrally formed so as to extend axially in said one direction, said rod or plunger being capable of acting directly on said pressure-sensitive switch to actuate it when the displacement of said piston exceeds a predetermined magnitude.

3. A trigger switch mechanism according to claim 1, in which said cylinder is made up of a first cylindrical member having telescoped into a second cylindrical member for the sake of ease of assembly and installation.

4. A trigger switch mechanism according to claim 1, in which said plunger extends axially from one end of said piston and terminates at a suitable distance from said particular portion of the vehicle body.

5. A trigger switch mechanism according to claim 1, in which said means comprises a shear pin provided in said cylinder to prevent movement of said piston with respect to said cylinder, the mechanical strength of said shear pin being such that if said force exceeds a predetermined value said shear pin is cut permitting movement of said piston.

6. A trigger switch mechanism according to claim 1, in which said pressure-sensitive switch comprises an inlet port leading to said cylinder chamber, a sensor such as a plate-like diaphragm biased toward said inlet port in such a manner as to tightly seal it off, and a pair of contacts which are brought into contact with each other when said spring is caused to bend away from said inlet port due to a rise in the pressure within said cylinder chamber.

* * * * *